(12) United States Patent
Miura et al.

(10) Patent No.: US 7,324,357 B2
(45) Date of Patent: Jan. 29, 2008

(54) POWER SUPPLY APPARATUS FOR ELECTRIC OPERATION

(75) Inventors: Masayoshi Miura, Kunitachi (JP); Kazumasa Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 240 days.

(21) Appl. No.: 10/948,329

(22) Filed: Sep. 23, 2004

(65) Prior Publication Data

US 2005/0068011 A1    Mar. 31, 2005

(30) Foreign Application Priority Data

Sep. 26, 2003   (JP)   ............................. 2003-336547

(51) Int. Cl.
*H02M 1/12* (2006.01)
(52) U.S. Cl. .......................................... 363/41; 606/32
(58) Field of Classification Search ................ 363/39, 363/40, 41, 44, 45, 46, 47; 336/65; 361/306.3; 606/32, 34
See application file for complete search history.

(56) References Cited

U.S. PATENT DOCUMENTS

| 4,607,621 | A | | 8/1986 | Wheeler |
| 4,866,367 | A | | 9/1989 | Ridley et al. |
| 5,977,853 | A | * | 11/1999 | Ooi et al. ...................... 336/65 |
| 6,459,597 | B1 | * | 10/2002 | Igarashi et al. ............... 363/39 |
| 6,473,291 | B1 | * | 10/2002 | Stevenson ................ 361/306.3 |
| 6,483,724 | B1 | | 11/2002 | Blair et al. |
| 2002/0060915 | A1 | | 5/2002 | Pomeroy |

FOREIGN PATENT DOCUMENTS

| JP | 60-83640 | 5/1985 |
| JP | 61-071777 | 4/1986 |
| JP | 06-339484 | 12/1994 |
| JP | 9-501577 | 2/1997 |
| JP | 2003-250270 | 9/2003 |
| WO | WO 95/09576 | 4/1995 |
| WO | WO 98/07378 | 2/1998 |

OTHER PUBLICATIONS

Sarda, Ivan G., et al., "Ceramic EMI Filters—A Review", Ceramic Bulletin (1988), vol. 67, No. 4, pp. 737-746.
Caponet, Marco C., et al., "EMI Filters Design for Power Electronics", IEEE (2002), vol. 4, No. 23, pp. 2027-2032.
Weston, David A., "Electromagnetic compatibility: principles and applications", Dekker (2001), pp. 452-453.
Weston, David A., "Electromagnetic compatibility: principles and applications", Dekker (2001), pp. 444-445.

* cited by examiner

*Primary Examiner*—Jessica Han
(74) *Attorney, Agent, or Firm*—Scully, Scott, Murphy & Presser, P.C.

(57) ABSTRACT

A power supply apparatus for electric operation is provided for an electric operation apparatus, and includes an instructing signal input portion which generates a DC output voltage to a high-frequency generating circuit that generates a high frequency and which receives an instructing signal for controlling the output voltage. The instructing signal input portion includes at least a noise reducing circuit which reduces a normal-mode noise.

21 Claims, 9 Drawing Sheets

POWER SUPPLY APPARATUS FOR ELECTRIC OPERATION

This application claims benefit of Japanese Application No. 2003-336547 filed on Sep. 26, 2003, the contents of which are incorporated by this reference.

BACKGROUND OF THE INVENTION

1. Field of the Invention

The present invention relates to a power supply apparatus for electric operation which is preferably used for an electric operation apparatus.

2. Description of the Related Art

In the surgical or medical operation, an electric operation apparatus is frequently used for treatments for incising or coagulating the affected portion by applying high-frequency current.

FIG. 7 shows the structure of an electric operation apparatus 21 according to a conventional art.

The electric operation apparatus 21 comprises: a power supply apparatus 23 which receives the commercial power supply by its connection to the commercial power supply 22; high-frequency generating circuit 24 which generates a high-frequency output based on a DC power output supplied from the power supply apparatus 23; a sensor circuit 25 which detects the voltage level and the current level of the high-frequency output that is outputted from the high-frequency generating circuit 24; and a CPU circuit 26 which controls the power supply apparatus 23 and the high-frequency generating circuit 24 based on the detected result that is inputted from the sensor circuit 25.

The high-frequency output of the high-frequency generating circuit 24 is connected to a high-frequency output connector portion 27 via the sensor circuit 25, and performs the treatment such as the incision and coagulation by feeding (outputting) the high-frequency current to a high-frequency cautery treatment tool (also referred to as a high-frequency electric scalpel) connected to the high-frequency output connector portion 27.

The CPU circuit 26 outputs an output voltage instructing signal (for controlling and) for instructing the output voltage to the power supply apparatus 23 based on the detected result of the sensor circuit 25. The power supply apparatus 23 receives the output voltage instructing signal from the CPU circuit 26 and supplies, to the high-frequency generating circuit 24, the DC power output in accordance with the output voltage instructing signal. The high-frequency generating circuit 24 generates the high-frequency output based on the DC power output supplied from the power supply apparatus 23.

Hereinbelow, the structure of the conventional power supply apparatus 23 will be described.

The power supply apparatus 23 comprises: a PFC circuit (power factor improving circuit) 31; a DC/DC converter circuit 32; and a control circuit 33.

The PFC circuit 31 effectively converts, into DC power, AC power inputted from the commercial power supply 22. The DC/DC converter circuit 32 generates the DC high-voltage output (power output) in accordance with the output voltage instructing signal which is inputted from the control circuit 33, and feeds the power output from its output terminal to the high-frequency generating circuit 24.

The control circuit 33 compares the output voltage instructing signal inputted from the CPU circuit 26 with an output voltage FB signal which is obtained by feeding back an output voltage of the power output, and outputs, to the DC/DC converter circuit 32, a signal for controlling the driving the DC/DC converter circuit 32 (specifically, switching element driving signal) based on the compared signal.

FIG. 8 shows the specific structure of the control circuit 33 shown in FIG. 7 and the DC/DC converter circuit 32.

The DC/DC converter circuit 32 comprises: an FET bridge (switching element bridge) 41 having field-effect transistors (hereinafter, abbreviated to FETS) Q1 to Q4; an insulating transfer 42; a diode bridge 43; and an output smoothing filter 44.

The FET bridge 41 receives the DC power from the PFC circuit 31. The FET bridge 41 is connected to a primary wiring of the insulating transfer 42, and executes the switching operation, thereby transmitting the power to a secondary wiring.

The diode bridge 43 is connected to the secondary wiring of the insulating transfer 42, the pulsating flow shaped by the diode bridge 43 is smoothed by the output smoothing filter 44 comprising a choke coil and a condenser. The smoothed DC power output is supplied to the high-frequency generating circuit 24. A negative line in the power output is connected to a patient circuit ground (abbreviated to a patient GND in FIGS. 7 and 8).

The power output is divided to two DC voltages with proper levels via two dividing resistors Ra and Rb, then, one voltage is inputted to one input terminal of an error amplifier 45 of the control circuit 33 as an output voltage feedback signal (abbreviated to an output voltage FB signal), and another voltage is inputted to another input terminal of the error amplifier 45 as a reference output voltage instructing signal.

The error amplifier 45 outputs the compared result of both the input signals as an error amplifier output signal to a PWM control circuit (pulse width modulation control circuit) 46. The PWM control circuit 46 outputs a switching element driving signal with pulse widths varied depending on a voltage value of the error-amplifier output.

Referring to FIG. 8, the switching element driving signal is applied to gates of the FET Q1 to Q4 forming the FET bridge 41 via an insulating element 47. Consequently, the FET bridge 41 is switched (on/off).

Drains of the FET Q1 and Q2 are connected to the positive output terminal of the PFC circuit 31, and sources of the FET Q1 and Q2 are connected to drains of the FET Q3 and Q4. Sources of the FET Q3 AND Q4 are connected to a primary circuit ground (abbreviated to the primary GND in FIG. 8). The sources of the FET Q1 and Q2 are connected to both ends of the primary wiring of the insulating transfer 42, and the diode bridge 43 comprising four diodes is connected to the secondary wiring.

The operation of the control circuit 33 will be described with reference to FIG. 8. First, the output voltage instructing signal and the output voltage FB signal are inputted to the error amplifier 45. The output voltage FB signal is obtained by dividing the power output by the resistors and therefore the voltage value changes in proportion to the power output.

The error amplifier 45 compares the output voltage FB signal with the reference output voltage instructing signal, and outputs the compared result to the PWM control circuit 46.

Referring to FIG. 9, the PWM control circuit 46 includes a comparator 48 which compares the output of the error amplifier with reference zigzag waves, and outputs the compared result as a switching element driving signal.

Referring to FIG. 10, when the voltage of the reference zigzag waves are higher than the voltage of the output of the error amplifier, the PWM control circuit 46 outputs the switching element driving signal. Then, the switching element driving signal is transmitted to the FET Q1 to Q4 forming the FET bridge 41 of the DC/DC converter circuit 32 via the insulating element 47.

Under the control of the driving so as to alternately switch on/off the FET Q2 and Q3 and the FET Q1 and Q4 of the FET bridge 41 in the DC/DC converter circuit 32 by using the output of the PWM control circuit 46, the power is transmitted to the secondary wiring via the insulating transfer 42. The transmitted power is shaped by the diode bridge 43 and further the DC power output smoothed by the output smoothing filter 44 is supplied to the high-frequency generating circuit 24.

By repeating the above-mentioned control operation, the DC/DC converter circuit 32 supplies, to the high-frequency generating circuit 24, the power output in accordance with the output voltage instructing signal.

Further, referring to FIG. 8, the output smoothing filter 44 for smoothing the output voltage is arranged to the output terminal of the DC/DC converter circuit 32. The output smoothing filter 44 functions as a low path filter and therefore reduces a cut-off frequency as a capacitance Cb of a smoothing capacitor and inductance Lb of the choke coil are higher.

As the cut-off frequency of the output smoothing filter 44 is lower, noises included in the power output are reduced. On the contrary, the response speed of the power output is slow.

Incidentally, PCT international publication No. 98/07378 discloses an electric operation apparatus.

SUMMARY OF THE INVENTION

According to the present invention, a power supply apparatus for electric operation is provided for an electric operation apparatus, and generates a DC output voltage to a high-frequency generating circuit that generates a high frequency. The power supply apparatus for electric operation includes at least a noise reducing circuit which is arranged to a signal input portion that receives an instructing signal for controlling the output voltage and which reduces a common-mode noise.

BRIEF DESCRIPTION OF THE DRAWINGS

FIG. 1 is an appearance diagram showing an electric operation apparatus according to the first embodiment of the present invention;

FIG. 2 is a block diagram showing the internal structure of the electric operation apparatus and the structure of a power supply apparatus according to the first embodiment;

FIG. 3 is a circuit diagram showing the structure of a main portion of the power supply apparatus having a normal-mode noise/common-mode noise removing circuit according to the first embodiment;

FIG. 4 is a circuit diagram showing the structure of a main portion of the power supply apparatus having a differential amplifier as noise removing means according to the first embodiment;

DESCRIPTION OF THE PREFERRED EMBODIMENTS

Hereinbelow, embodiments of the present invention will be described with reference to the drawings.

A first embodiment of the present invention will be described with reference to FIGS. 1 to 4.

Figure 1:
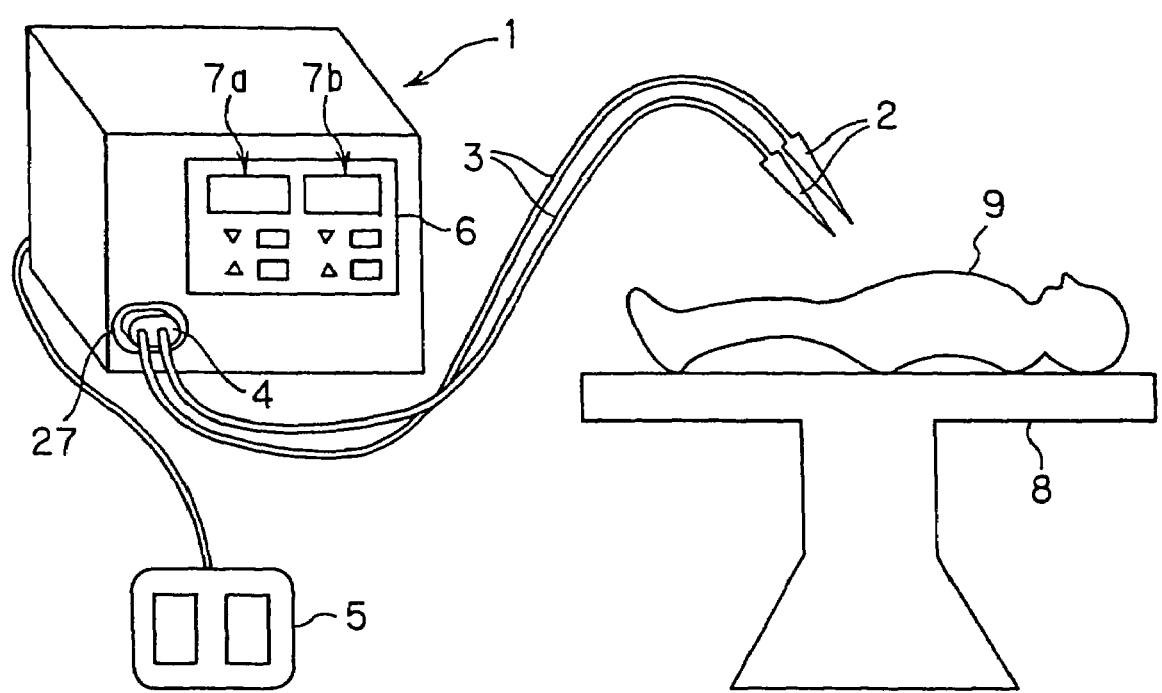
FIGS. 1 to 4 relate to a first embodiment.

Referring to FIG. 1, an electric operation apparatus 1 comprises a high-frequency output connector portion 27 in front of a casing. A connector 4 of a cable 3 connected to a high-frequency electric scalpel 2 is detachably connected to the high-frequency output connector portion 27.

A foot switch 5 is connected to the electric operation apparatus 1, and instructs the on/off operation of the high-frequency output.

An operating panel 6 of the electric operation apparatus 1 has an incision mode setting portion 7a and a coagulating mode setting portion 7b so as to output the high frequency with an output waveform suitable to the medical treatment such as the incision or coagulation, in accordance therewith, and displays an output setting and an output value in the incision mode setting portion 7a and the coagulating mode setting portion 7b.

The high-frequency electric scalpel 2 performs a medical treatment such as incision or coagulation on a patient 9 that is placed on an operation bed 8.

Although a bi-polar system high-frequency electric scalpel 2 is briefly shown in FIG. 1, a mono-polar system high-frequency electric scalpel may be connected and used with an opposite-polar plate.

Figure 2:
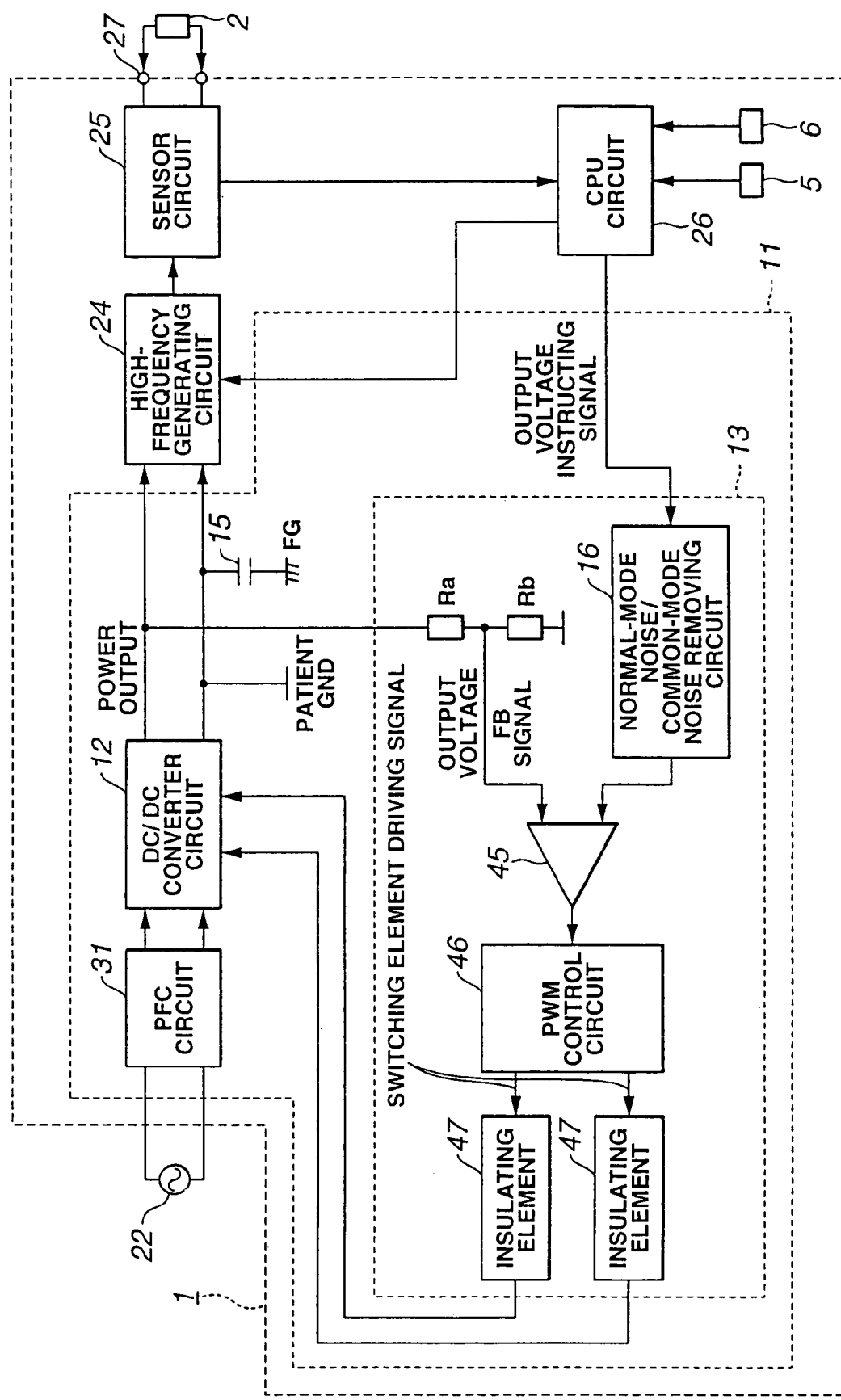

FIG. 2 shows the internal structure of the electric operation apparatus 1. Referring to FIG. 2, the electric operation apparatus 1 comprises: the power supply apparatus 11 according to the first embodiment; a high-frequency generating circuit 24; a sensor circuit 25; and a CPU circuit 26.

The foot switch 5 and the operating panel 6 are connected to the CPU circuit 26.

Figure 7:
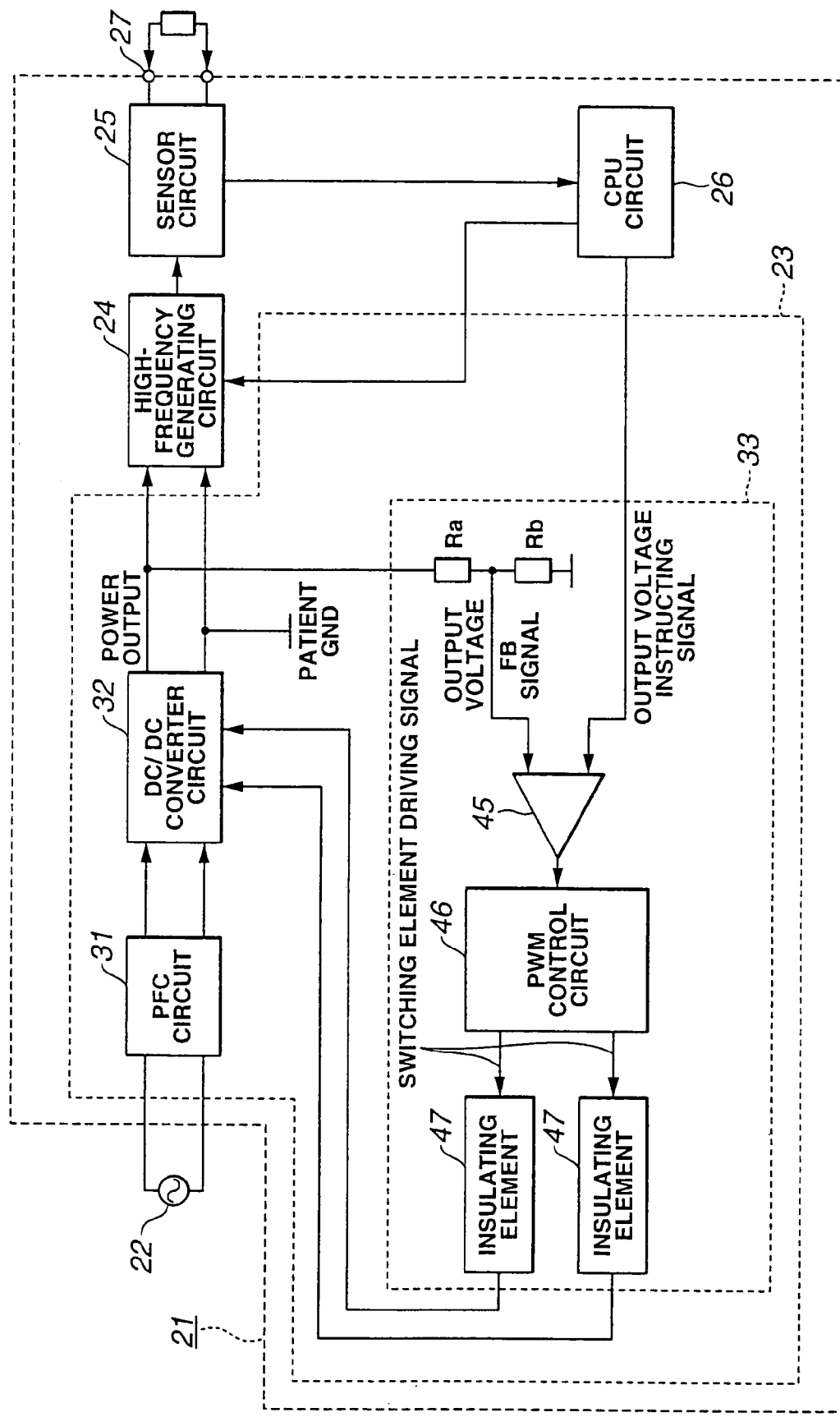
FIG. 7 is a block diagram showing the internal structure of an electric operation apparatus and a power supply apparatus according to a conventional art.

The electric operation apparatus 1 shown in FIG. 2 uses the power supply apparatus 11, in place of the power supply apparatus 23 shown in FIG. 7.

The power supply apparatus 11 according to the first embodiment comprises: a PFC circuit 31; a DC/DC converter circuit 12; and a control circuit 13. Similarly to FIG. 7, the PFC circuit 31 converts AC power supplied from the commercial power supply 22 into DC power, and supplies the converted power to the DC/DC converter circuit 12.

Figure 3:
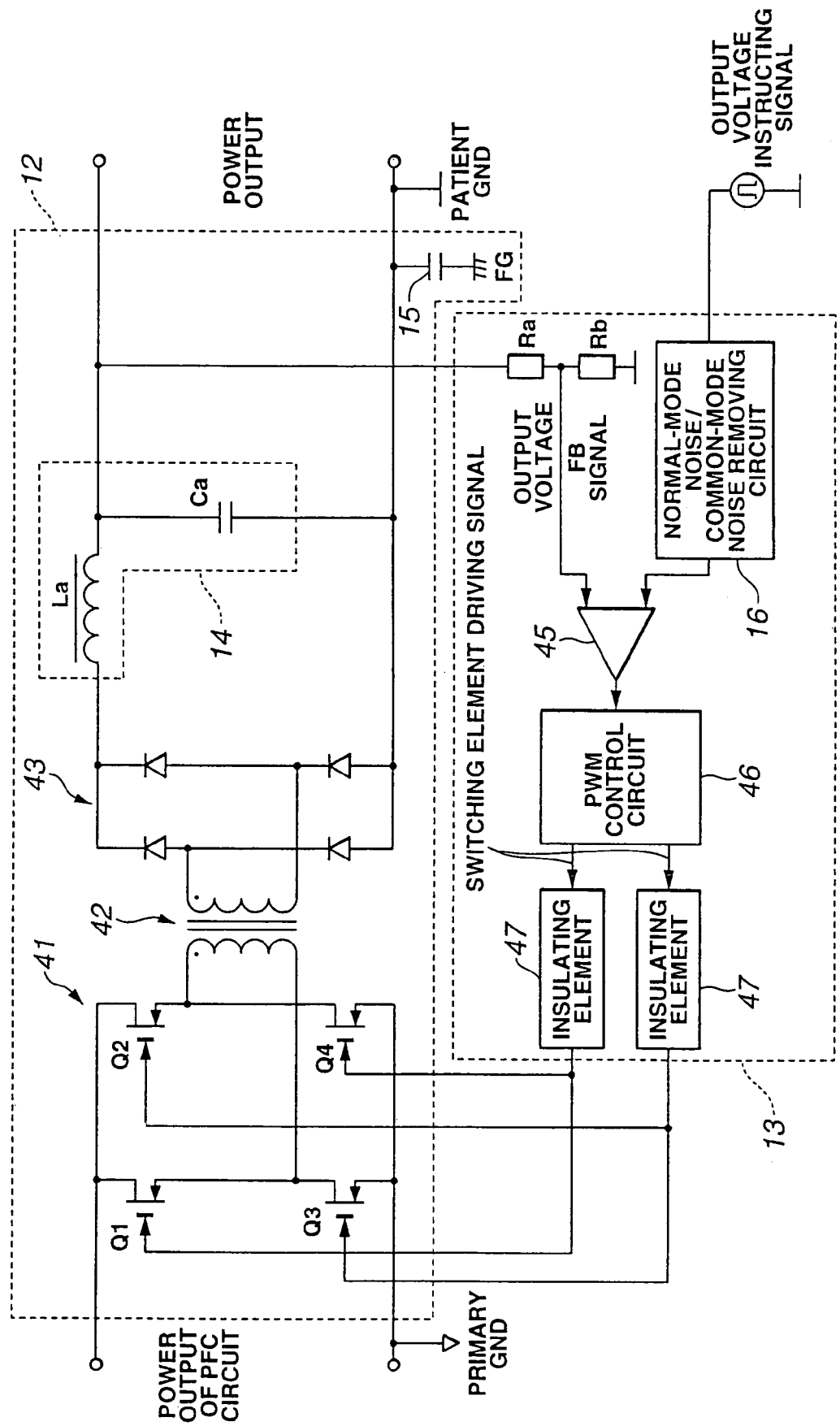

The DC/DC converter circuit 12 and the control circuit 13 in the power supply apparatus 11 according to the first embodiment has the structure shown in FIG. 3.

Figure 8:
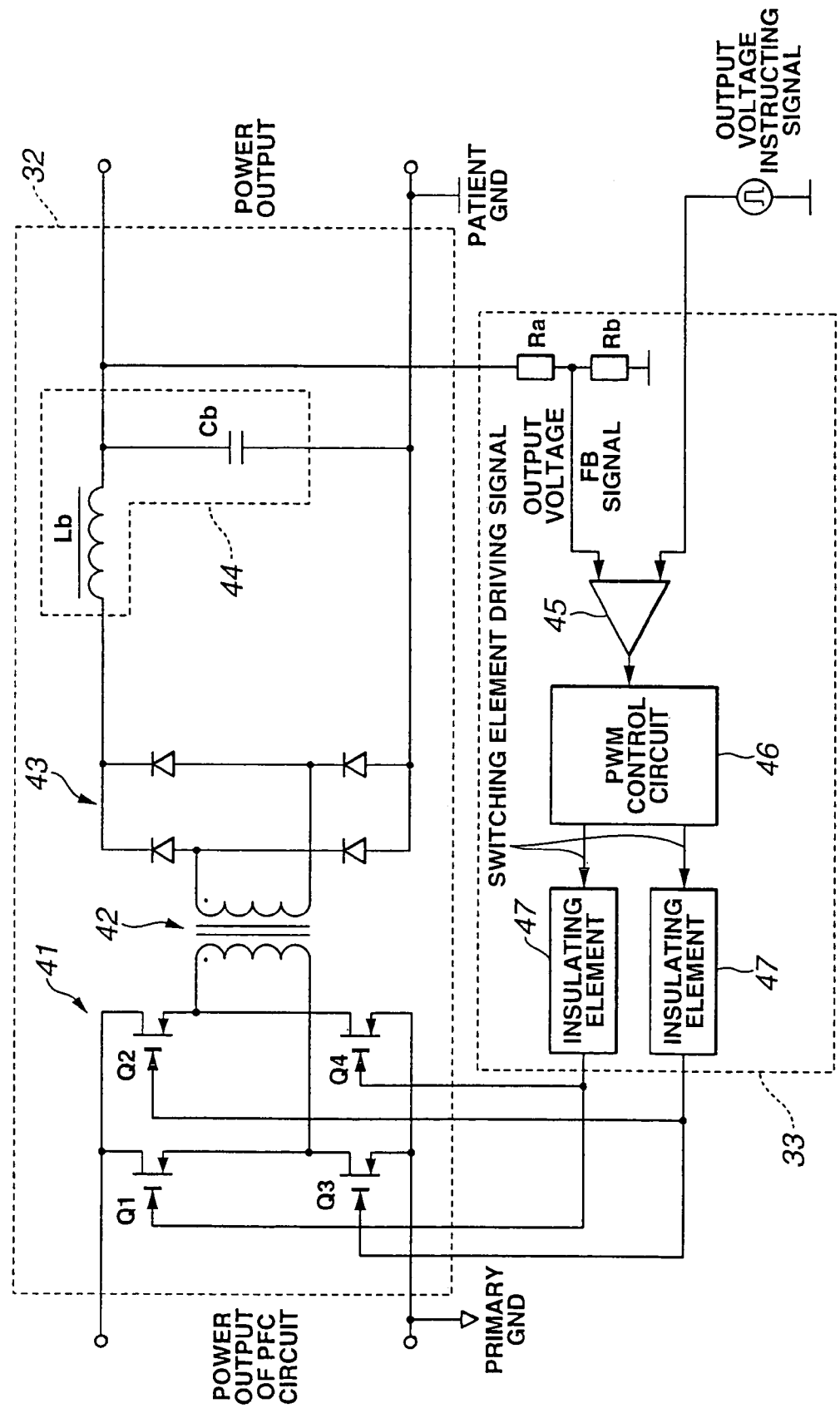
FIG. 8 is a circuit diagram showing the structure of a main portion of the power supply apparatus according to the conventional art.

Referring to FIG. 3, the DC/DC converter circuit 12 is obtained by using an output smoothing filter (or low path filter) 14 comprising a capacitor with a capacitance Ca and a choke coil with inductance La for obtaining a higher cut-off frequency (specifically, 500 Hz or more), in place of the output smoothing filter 44, in the DC/DC converter circuit 32 shown in FIG. 8 and by connecting the patient circuit GND of the DC/DC converter circuit 12 to a frame ground (abbreviated to an FG) via a capacitor 15 as capacitor connecting means.

The capacitor 15 uses a capacitor with such preferable frequency property that the impedance is low up to the higher frequency, such as a laminated ceramic capacitor. In addition to the laminated ceramic capacitor, a non-laminated ceramic capacitor, a polyester film capacitor, a polystyrene capacitance, and a mica capacitor may be used. Incidentally, the capacitance of the capacitor 15 is, e.g., 1,000 pF.

The DC/DC converter circuit 12 comprises: a field-effect transistor (hereinafter, abbreviated to FET) bridge (switching element bridge) 41 comprising filed-effect transistors (hereinafter, abbreviated to FETS) Q1 to Q4; an insulating transfer 42; a diode bridge 43; and the output smoothing filter 14.

The DC current is supplied (inputted) to the FET bridge 41 from the PFC circuit 31. The FET bridge 41 is connected to the primary wiring of the insulating transfer 42, and the FET bridge 41 is switched on, thereby transmitting the power to the secondary wiring.

The diode bridge 43 is connected to the secondary wiring of the insulating transfer 42. The pulsating flow shaped by the diode bridge 43 is smoothed by the output smoothing filter 14 comprising the choke coil and the capacitor. The smoothed DC power output is supplied to the high-frequency generating circuit 24. The negative line of the power output is connected to a patient circuit ground (abbreviated to the patient GND in FIGS. 2 and 3).

The power output is divided to two DC voltages with proper levels via two dividing resistors Ra and Rb, and the voltages are inputted to one input terminal of an error amplifier 45 of the control circuit 13, as output voltage feedback signals (abbreviated to output voltage FB signals).

According to the first embodiment, a reference output voltage instructing signal is inputted to another input terminal of the error amplifier 45 via the normal-mode noise/common-mode noise removing circuit 16.

The error amplifier 45 outputs, to a PWM control circuit (pulse width modulation control circuit) 46, the compared results of the two input signals as error amplifier output signals. The PWM control circuit 46 outputs switching element driving signals with varied pulse widths, in accordance with the voltage level of the error amplifier output.

The switching element driving signal is applied to gates of the FETs Q1 to Q4 forming the FET bridge 41 via the insulating element 47 such as a pulse transfer. The FET bridge 41 is switched on/off.

Drains of the FETs Q1 and Q2 are connected to a positive output terminal of the PFC circuit 31. Sources of the FETs Q1 and Q2 are connected to drains of the FETs Q3 and Q4. Sources of the FETs Q3 and Q4 are connected to the primary-circuit ground (abbreviated to the primary GND in FIG. 3). The sources of the FETs Q1 and Q2 are connected to both ends of the primary wiring of the insulating transfer 42, and the diode bridge 43 comprising four diodes are connected to the secondary wiring of the insulating transfer 42.

Unlikely to the control circuit 33 shown in FIG. 8, the control circuit 13 according to the first embodiment comprises a normal-mode noise/common-mode noise removing circuit 16, as noise removing means (noise reducing means), which removes or reduces a normal-mode noise (also referred to as a differential-mode noise) and a common-mode noise at a signal input portion which receives the output voltage instructing signal.

As mentioned above, the input terminal of the error amplifier 45 receives the output voltage FB signal which is obtained by dividing the power output of the DC/DC converter circuit 12 by the resistors Ra and Rb and an output signal of the normal-mode noise/common-mode noise removing circuit 16 whose input terminal receives the output voltage instructing signal.

Figure 4:
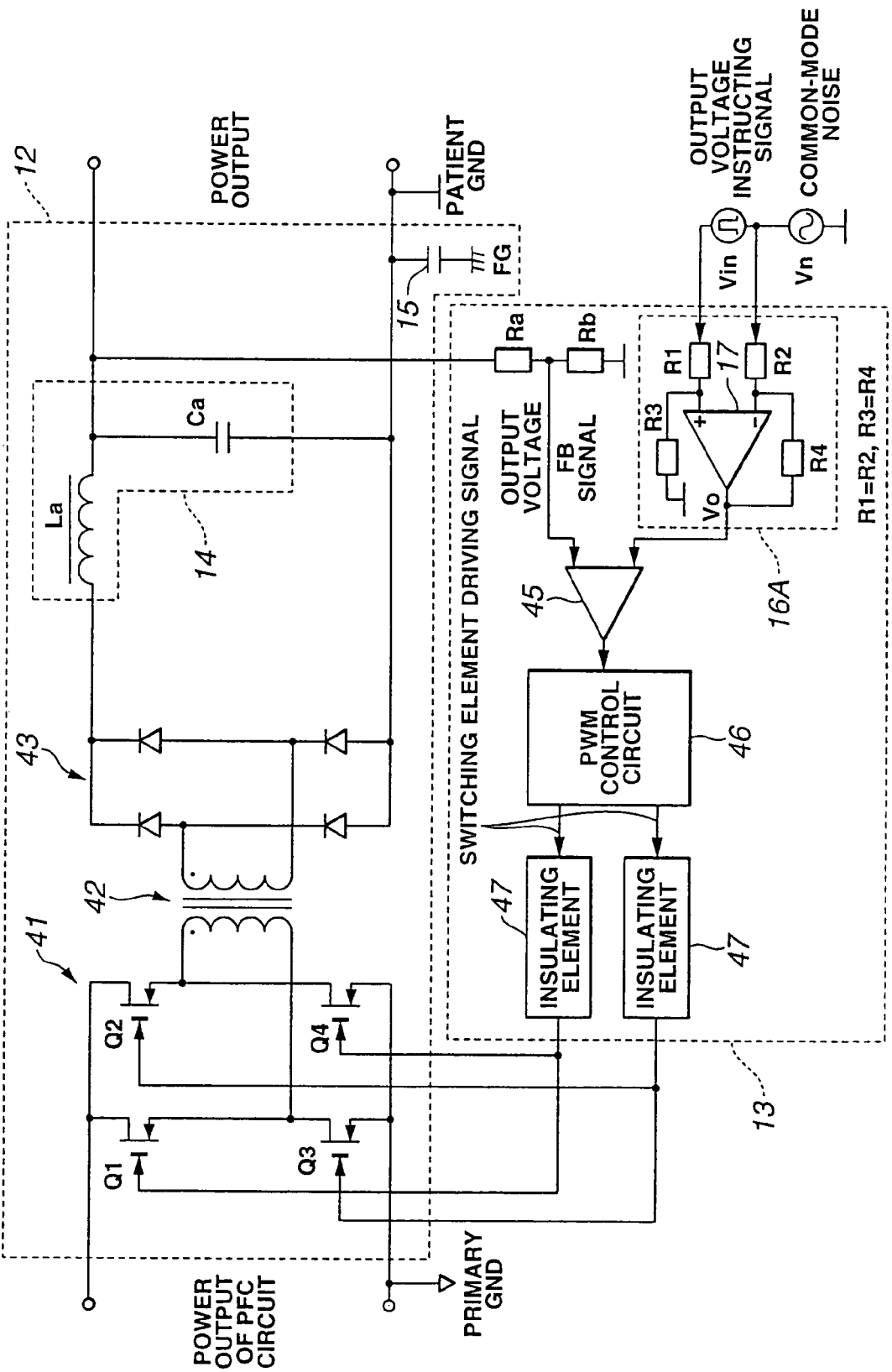

FIG. 4 shows the main portion of the power supply apparatus 11, as the normal-mode noise/common-mode noise removing circuit 16 shown in FIG. 3, including the control circuit 13 using a differential amplifier circuit 16A.

Referring to FIG. 4, the differential amplifier circuit 16A is arranged to the signal input portion of the control circuit 13, thereby removing or reducing the normal-mode noises and the common-mode noises in the control circuit 13.

The output voltage instructing signal is inputted to the non-inverting and inverting input terminals of the differential amplifier circuit 16A via resistors R1 and R2. The non-inverting input terminal of the differential amplifier circuit 16A is connected to the ground of the power output via a resistor R3. The inverting input terminal is connected to an output terminal of the differential amplifier circuit 16A via a resistor R4. The output terminal of the differential amplifier circuit 16A is connected to the error amplifier 45.

According to the first embodiment, the response speed is improved by setting, to be higher, the cut-off frequency of the output smoothing filter 14 in the DC/DC converter circuit 12. Since the cut-off frequency of the output smoothing filter 14 is set to be higher, the noises increase. However, according to the first embodiment, the common-mode noises are reduced by connecting the ground of the output terminal of the DC/DC converter circuit 12 to a frame ground (abbreviated to an FG) via capacitor connecting means and further noise removing means is arranged to remove or reduce the normal-mode noises and the common-mode noises to the signal input portion of the control circuit 13. Consequently, the noise mixing in the control circuit 13 is suppressed.

Hereinbelow, a description is given of the operation with the above-mentioned structure according to the first embodiment.

The error amplifier 45 as the signal input portion of the control circuit 13 receives the output voltage FB signal which is obtained by dividing the output voltage of the DC/DC converter circuit 12 and the output voltage instructing signal via the normal-mode noise/common-mode noise removing circuit 16.

The output voltage FB signal inputted to the error amplifier 45 is a signal which is obtained by diving the power output by resistors and therefore the voltage level of the signal changes in proportion to the power output.

The error amplifier 45 compares the reference output voltage instructing signal with the output voltage FB signal and then outputs the compared result to the PWM control circuit 46.

Figure 9:
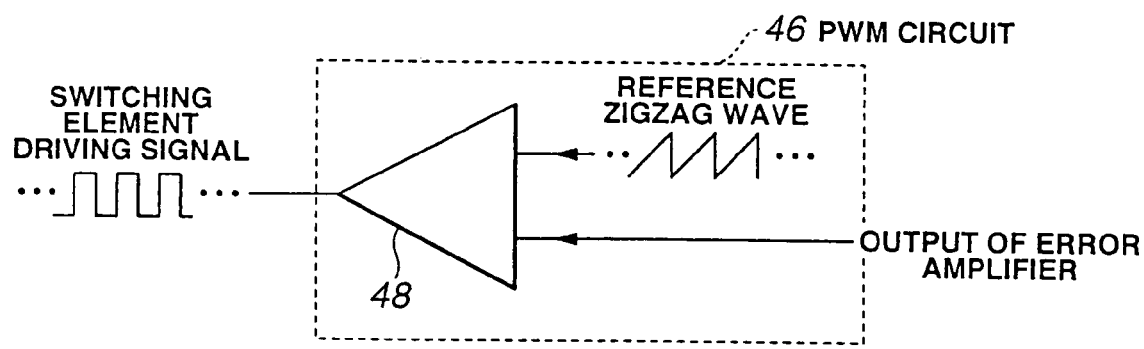
FIG. 9 is a circuit diagram showing a main portion of a PWM control circuit.

As mentioned above with reference to FIG. 9, the PWM control circuit 46 comprises the comparator 48 which compares the error amplifier output with the reference zigzag wave. Further, the PWM control circuit 46 outputs the compared result as the switching element driving signal.

Figure 10:
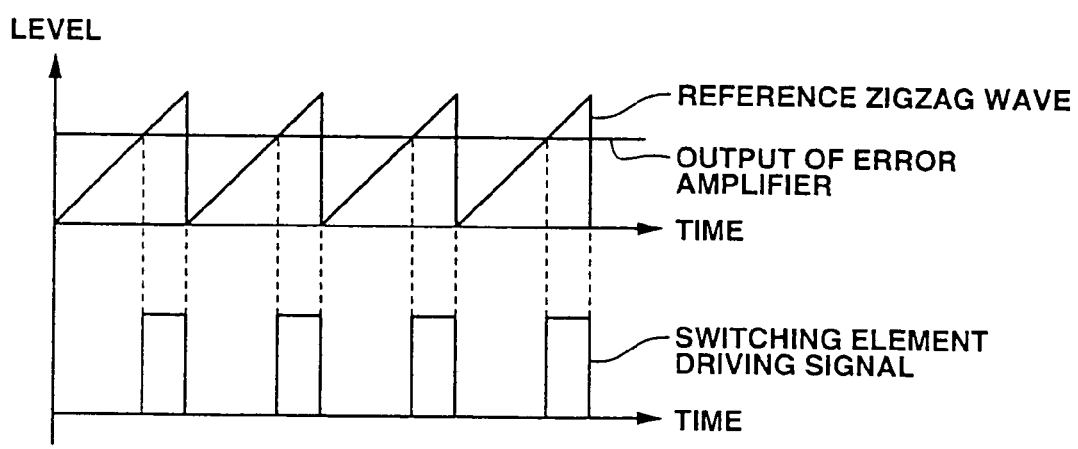
FIG. 10 is an explanatory diagram showing the operation of a PWM control circuit.

Specifically, as shown in FIG. 10, when the voltage of the reference zigzag wave is higher than the voltage of the error amplifier output, the PWM control circuit 46 outputs the switching element driving signal. Then, the switching element driving signal is transmitted to the FETs Q1 to Q4 forming the FET bridge 41 of the DC/DC converter circuit 12 via the insulating element 47.

Under the control of the driving so as to alternately switch on/off the FETs Q2 and Q3 and the FETs Q1 and Q4 of the FET bridge 41 in the DC/DC converter circuit 12 by using the output of the PWM control circuit 46, the power is transmitted to the secondary wiring via the insulating transfer 42. The transmitted power is shaped by the diode bridge 43 and further the DC power output smoothed by the output smoothing filter 14 is supplied to the high-frequency generating circuit 24.

By repeating the above-mentioned control operation, the DC/DC converter circuit 12 supplies, to the high-frequency generating circuit 24, the power output in accordance with the output voltage instructing signal.

According to the first embodiment, since the cut-off frequency of the output smoothing filter 14 is set to be higher, the noises increase. However, the noise mixing is suppressed as follows.

That is, referring to FIG. 3, the capacitor 15 couples the FG (ground) and the ground of the power output of the DC/DC converter circuit 12. Thus, the GND potential of the power output is more stable, as compared with that according to the conventional art, thus to reduce the normal-mode noise and common-mode noise which are mixed to the signal input portion of the control circuit 13, from the power output.

By coupling to the FG by using the capacitor 15, the impedance is reduced between the ground of the power output and the FG. Further, the normal-mode noise and common-mode noise mixed to the positive line via the capacitor (its capacitance Ca) forming the output smoothing filter 14 are reduced.

As a consequence, it is reduced the noises mixed to the control circuit 13 from the line of the power output of the DC/DC converter circuit 12.

The differential amplifier circuit 16A is arranged to the signal input portion in the control circuit 13 as shown in FIG. 4. The common-mode noises are reduced as follows and the generation of normal-mode noises is suppressed in the control circuit 13.

Referring to FIG. 4, reference symbol Vin denotes the output voltage instructing signal, and it is assumed that the common-mode noise is mixed to the output voltage instructing signal Vin.

Then, signals applied to the non-inversing input terminal and inverting terminal of the differential amplifier circuit 16A are expressed by (Vin+Vn) and Vn, respectively. When R1=R2 and R3=R4, the differential amplifier circuit 16A outputs an output Vo as follows.

$$Vo=(R3/R1)\{(Vin+Vn)-Vn\}=(R3/R1)\times Vin$$

The use of the differential amplifier circuit 16A enables the reduction of the common-mode noises mixed in the output voltage instructing signal. The common-mode noises are removed in the signal input portion of the control circuit 13, thus, the generating of normal-mode noises is suppressed in the control circuit 13 and the common-mode noise and the normal-mode noise are removed or are reduced.

The property for removing the noises of the differential amplifier circuit 16A is determined by CMRR (common mode rejection ratio) of the differential amplifier circuit 16A, normally, 80 dB, and can sufficiently suppress the common-mode noises.

The influence of the frequency property of CMRR enables the more reduction of noise removing property as the frequency is higher. Further, the deterioration of noise removing property is prevented with the cut-off frequency (e.g., 500 Hz or more) of the output smoothing filter 14.

As the capacitor 15 which couples the capacitance of the FG and the ground of the power output from the DC/DC converter circuit 12, a capacitor with preferable frequency property may be used, e.g., the laminated ceramic capacitor. Thus, the necessary insulating property is assured and the common-mode noise and the normal-mode noise are reduced.

As mentioned above, according to the first embodiment, the response speed is improved by increasing the cut-off frequency of the output smoothing filter 14 in the DC/DC converter circuit 12, and the noises are reduced and the stable operation is realized by arranging the noise removing means.

As mentioned above according to the conventional art, the response speed of the power output is not delayed because of the reduction of noises, but both the fast response and the noise reduction are established.

According to the first embodiment, the fast speed of the power supply apparatus 11 is ensured and the treatments such as the incision of the high-frequency electric scalpel and the coagulating are properly performed without noises. In this case, according to the first embodiment, the response property of the power output is further improved as compared with the conventional art. Therefore, when the treatments change the organ of the patient, the power output is supplied in fast response to the change. The more proper power-supply is possible.

Also, according to the first embodiment, the reliability for the power supply apparatus 11 and the electric operation apparatus is improved.

Next, a second embodiment of the present invention will be described with reference to FIG. 5.

Figure 5:
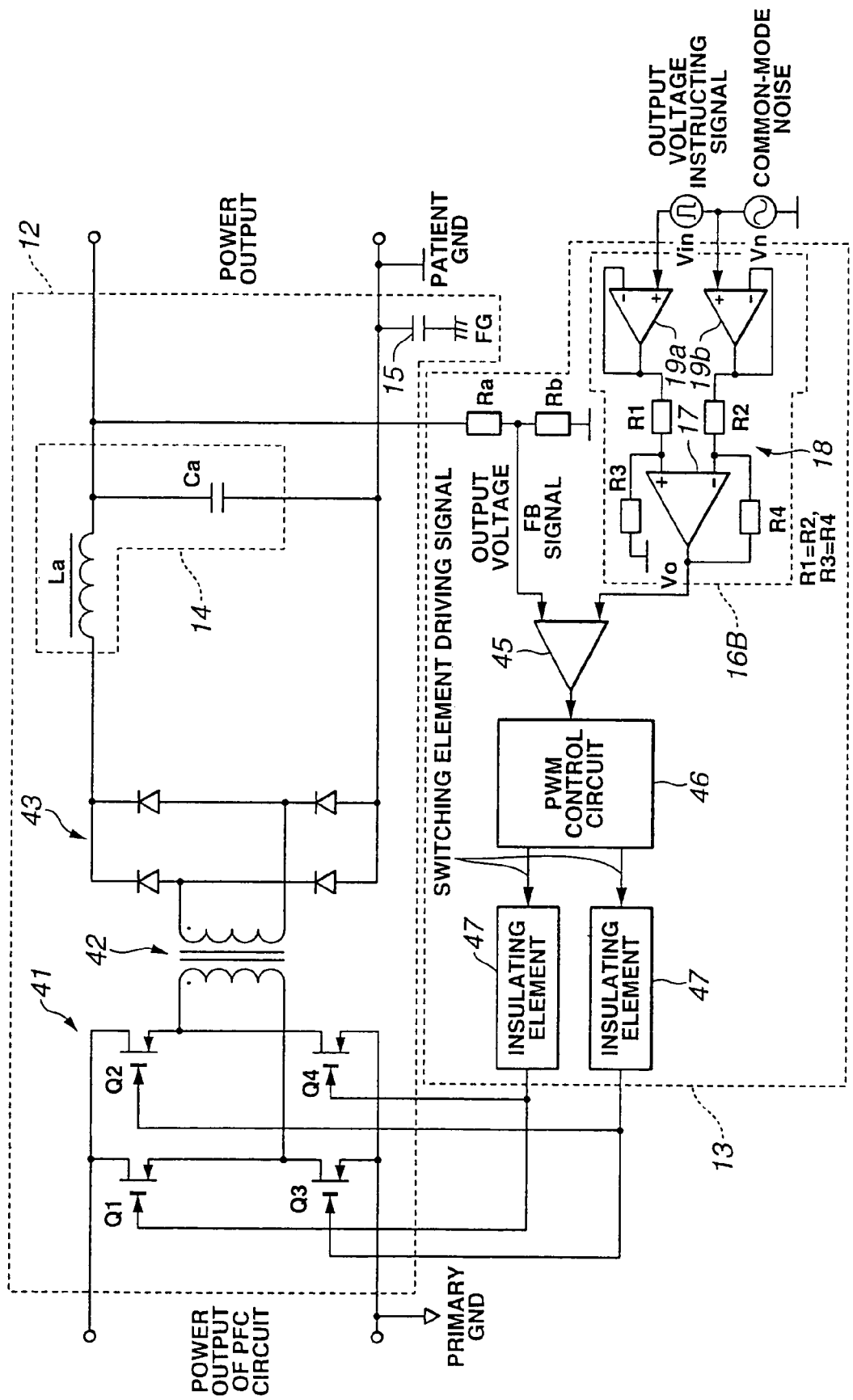
FIG. 5 is a circuit diagram showing the structure of a main portion of a power supply apparatus having an instrumentation amplifier as the noise removing means according to a second embodiment.

FIG. 5 shows the structure of a main portion of a power supply apparatus according to the second embodiment. According to the second embodiment, an instrumentation amplifier circuit 16B is used as the normal-mode noise/common-mode noise removing circuit 16.

The non-inverting input terminal of the instrumentation amplifier circuit 16B is connected to the ground of the power output via a resistor R3. The inverting input terminal of the instrumentation amplifier circuit 16B is connected to the output terminal thereof.

Referring to FIG. 5, reference symbol Vin denotes the output voltage instructing signal and reference symbol vn denotes the common-mode noise. Then, the signals applied to the non-inverting input terminal and inverting input terminal of the instrumentation amplifier circuit 16B are expressed by (Vin+Vn) and Vn, respectively.

In this case, when R1=R2 and R3=R4, in the instrumentation amplifier circuit 16B, an output Vo is as follows.

$$Vo=(R3/R1)\{(Vin+Vn)-Vn\}=(R3/R1)\times Vin$$

Therefore, by using the instrumentation amplifier 16B, the common-mode noises, mixed in the output voltage instructing signal are removed.

Further, by removing the common-mode noises in an input portion of the control circuit 13, the normal-mode noises are suppressed in the control circuit 13.

The removing property of the instrumentation amplifier circuit 16B is determined depending on the CMRR of the instrumentation amplifier circuit 16B. In this case, the CMRR of the instrumentation amplifier circuit 16B is further higher (normally, higher by several tens dB), as compared with the case of the differential amplifier circuit 16A. Thus, the property for removing the noises is further improved.

As a result of the influence of the CMRR frequency property, as the frequency is higher, the noise removing property is reduced. However, similarly to the first embodiment, the reduction of the noise removing property is prevented up to the frequency that is equal to the cut-off frequency or more of the output smoothing filter 14.

The second embodiment has the same advantages as those according to the first embodiment and the function for reducing or removing the noises is improved.

Figure 6:
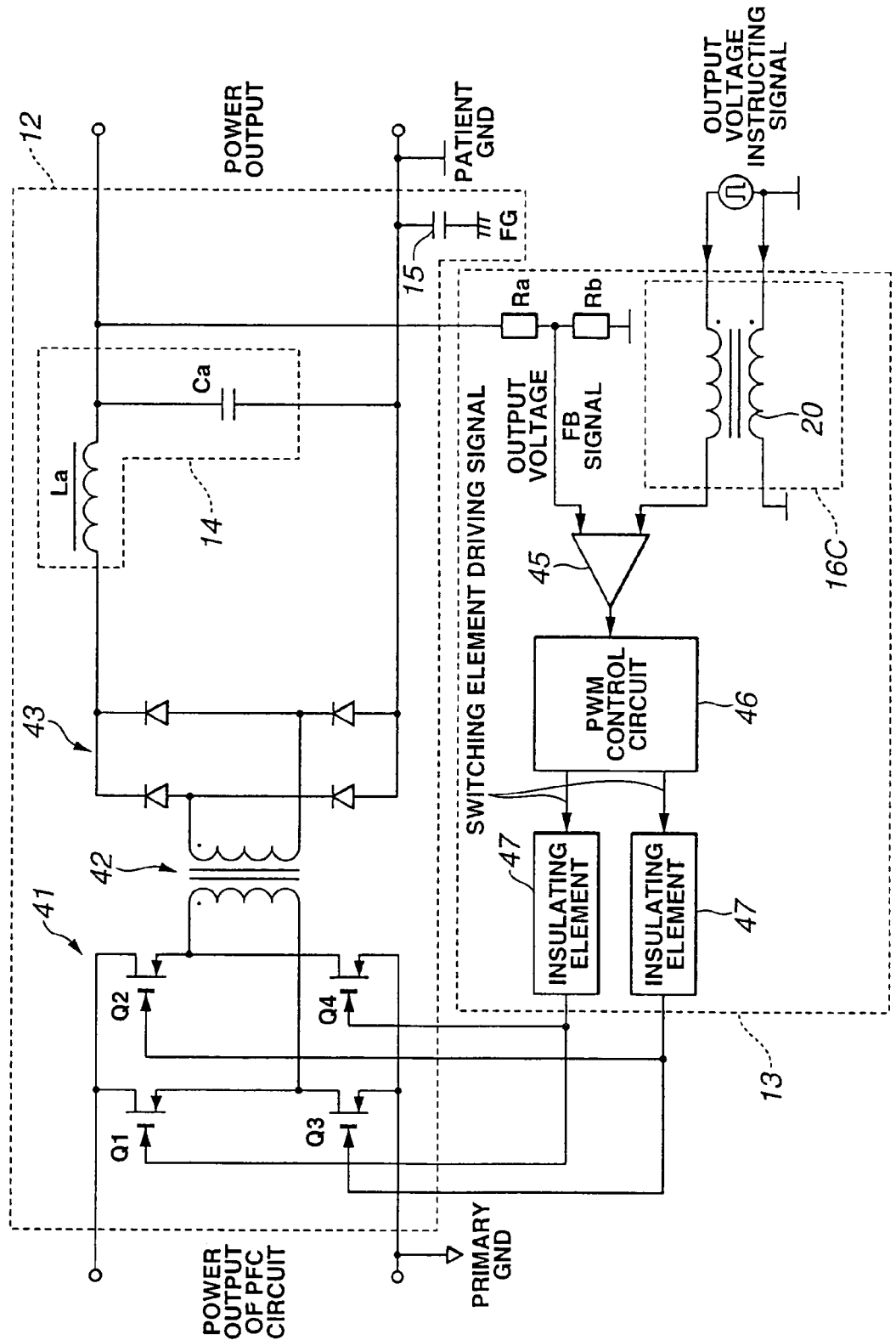
FIG. 6 is a circuit diagram showing the structure of a main portion of a power supply apparatus having a common-mode choke coil as the noise removing means according to a third embodiment.

Next, a third embodiment of the present invention will be described with reference to FIG. 6. FIG. 6 shows the structure of a main portion of a power supply apparatus according to third embodiment. According to the third embodiment, a normal-mode noise/common-mode noise removing circuit 16C comprises a common-mode choke coil 20.

The common-mode choke coil 20 operates as the choke coil, only for the same phase signal (current).

The output voltage instructing signal is inputted and then the current in one signal line of the common-mode choke coil 20 is opposite to the current in another feedback line. Therefore, the magnetic fluxes generated in the common-mode choke coil 20 are mutually negated, that is, this state is close to the non-insertion of the choke coil.

On the contrary, the common-mode noises with the same phase flow to the common-mode choke coil 20 and then the magnetic fluxes generated in the common-mode choke coil 20 have the same direction and are mutually strengthen. Then, the high inductance shown for the common-mode noises and the noise flow is suppressed.

Thus, by using the common-mode choke coil, the common-mode noise mixed in the output voltage instructing signal are removed. Further, by removing the common-mode noises in the input portion of the control circuit 13, the generation of the normal-mode noises is suppressed in the control circuit 13.

The noise removing property using the common-mode choke coil 20 is determined depending on the inductance of the common-mode choke coil 20. Further, the noise removing property is reduced by the frequency higher than the resonant frequency under the influence of the stray capacitance of the wiring and the inductance. However, the influence of the inductance and the stray capacitance of the wiring is reduced by setting the resonant frequency of the common-mode choke coil 20 to be higher than the one of the cut-off frequency of the output smoothing filter 14.

Having described the preferred embodiments of the invention referring to the accompanying drawings. It should be understood that the present invention is not limited to those precise embodiments and various changes and modifications thereof could be made by one skilled in the art without departing from the spirit of scope of the invention as defined in the appended claims.

What is claimed is:

1. An electrical surgical device including a power supply apparatus for electric operation, the power supply apparatus comprising:
   a DC voltage generating circuit which generates and supplies a DC output voltage signal to a high-frequency generating circuit, which high-frequency generating circuit generates a high frequency drive signal for driving the electric surgical apparatus in response to a DC voltage control signal; and
   a controlling circuit for generating the DC voltage control signal, and including a noise reducing circuit arranged at a signal input portion of the controlling circuit to receive an instructing signal and generate the DC voltage control signal, wherein the noise reducing circuit reduces at least a common-mode noise.

2. The electrical surgical device according to claim 1, wherein the noise reducing circuit reduces a normal-mode noise as well as the common-mode noise.

3. The electrical surgical device according to claim 1, the DC voltage generating circuit further comprising:
   a capacitance coupling device arranged between DC voltage generating circuit ground and earth ground.

4. The electrical surgical device according to claim 3, wherein the capacitance coupling device is a capacitor having preferable frequency property.

5. The electrical surgical device according to claim 4, wherein the capacitor is one of a ceramic capacitor and a laminated ceramic capacitor.

6. The electrical surgical device according to claim 4, wherein the capacitor has a capacitance of approximately 1,000 pF.

7. The electrical surgical device according to claim 1, wherein the noise reducing circuit comprises a differential amplifier.

8. The electrical surgical device according to claim 1, wherein the noise reducing circuit comprises an instrumentation amplifier.

9. The electrical surgical device according to claim 1, wherein the noise reducing circuit comprises a common-mode choke coil.

10. The electrical surgical device according to claim 1, wherein the DC voltage generating circuit includes a smoothing filter having a high cut-off frequency.

11. The electrical surgical device according to claim 10, wherein the cut-off frequency of the smoothing filter is 500 Hz or more.

12. An electrical surgical device including a power supply apparatus for electric operation, the power supply comprising:
   a DC voltage generating circuit which generates and supplies a DC output voltage signal to a high-frequency generating circuit in accordance with a control signal; and
   a control circuit for generating the control signal and including a signal input portion that receives an instructing signal for controlling the DC output voltage signal and for reducing common-mode noise and normal-mode noise.

13. An electrical surgical device including a power supply apparatus for electric operation, the power supply apparatus comprising:
   a DC voltage generating circuit which generates and provides a DC output voltage signal to a high-frequency generating circuit, the DC voltage generating circuit responsive to a control signal;
   a smoothing filter electrically connected to an output portion of the DC voltage generating circuit; and
   a controller circuit for generating a control signal and including a noise reducing circuit arranged at a signal input portion of the controller circuit for receiving an instructing signal for controlling an output voltage of the power supply; wherein common-mode noise is minimized in accordance with said control signal.

14. The electrical surgical device according to claim 13, wherein a cut-off frequency of the smoothing filter is 500 Hz or more.

15. The electrical surgical device according to claim 13, wherein the noise reducing circuit reduces a normal-mode noise as well as the common-mode noise.

16. The electrical surgical device according to claim 13, the DC voltage generating circuit further comprising:
   a capacitance coupling device arranged between DC voltage generating circuit ground and earth ground.

17. The electrical surgical device according to claim 16, wherein the capacitance coupling device is a capacitor having preferable frequency property.

18. The electrical surgical device according to claim 17, wherein the capacitor is a ceramic capacitor or a laminated ceramic capacitor.

19. The electrical surgical device according to claim 13, wherein the noise reducing circuit comprises a differential amplifier.

20. The electrical surgical device according to claim 13, wherein the noise reducing circuit comprises an instrumentation amplifier.

21. The electrical surgical device according to claim 13, wherein the noise reducing circuit comprises a common-mode choke coil.

* * * * *